May 5, 1925.                                                          1,536,719
G. LANE ET AL
METHOD OF AND APPARATUS FOR STEREOSCOPIC PHOTOGRAPHY
Filed Aug. 11, 1923          2 Sheets-Sheet 1
Fig. 1.
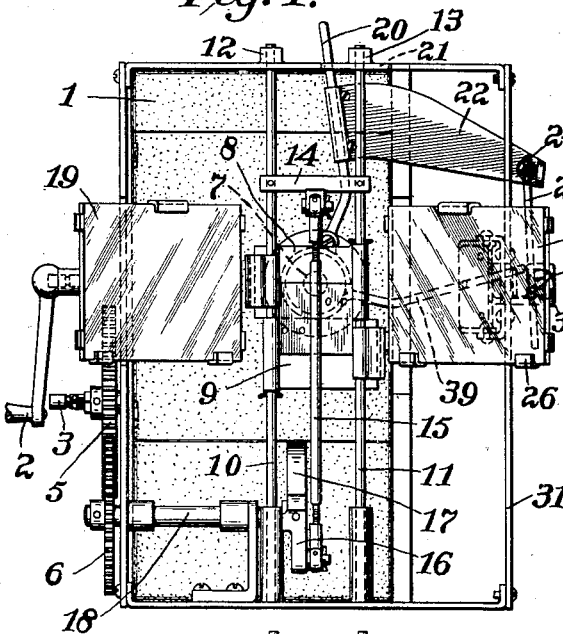
Fig. 3.
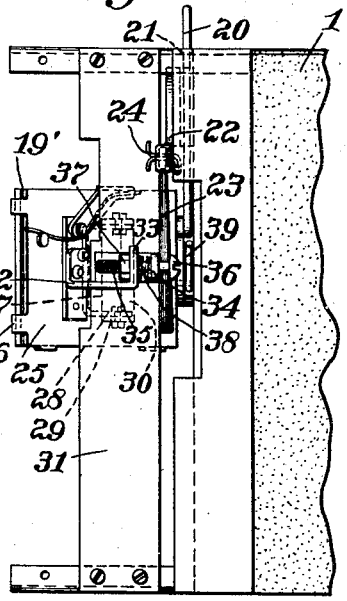
Fig. 2.
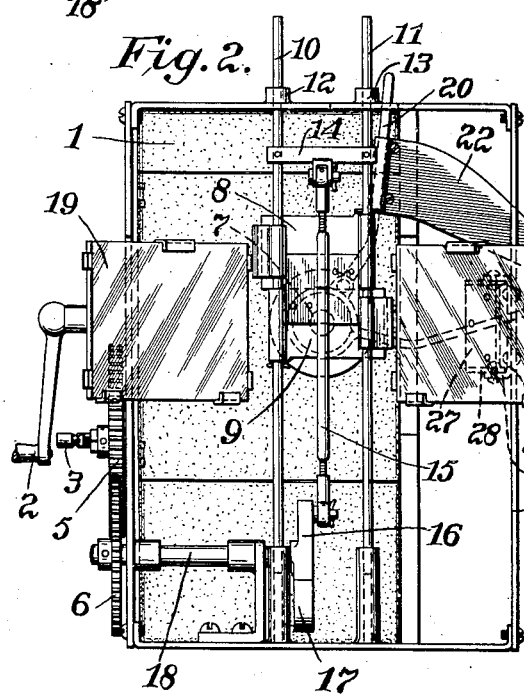
Fig. 4.
Fig. 5.
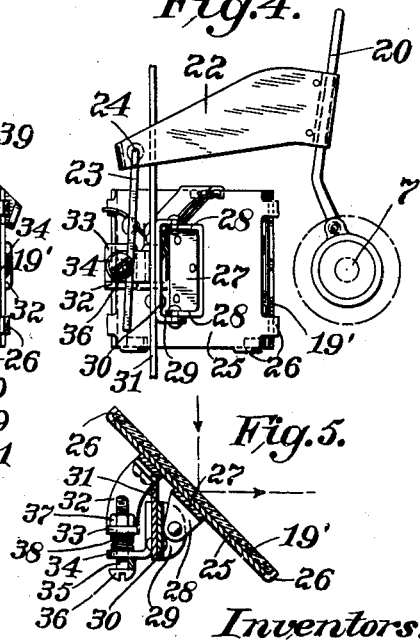
Inventors:
George Lane,
John E. Patterson,
by Spear, Middleton, Donaldson & Hall
Attys.

May 5, 1925. 1,536,719
G. LANE ET AL
METHOD OF AND APPARATUS FOR STEREOSCOPIC PHOTOGRAPHY
Filed Aug. 11, 1923 2 Sheets-Sheet 2
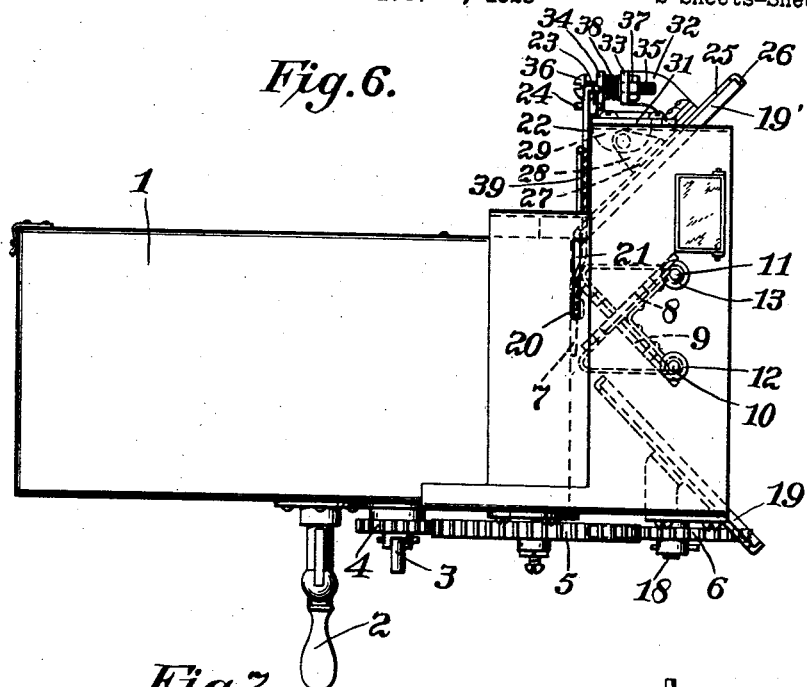
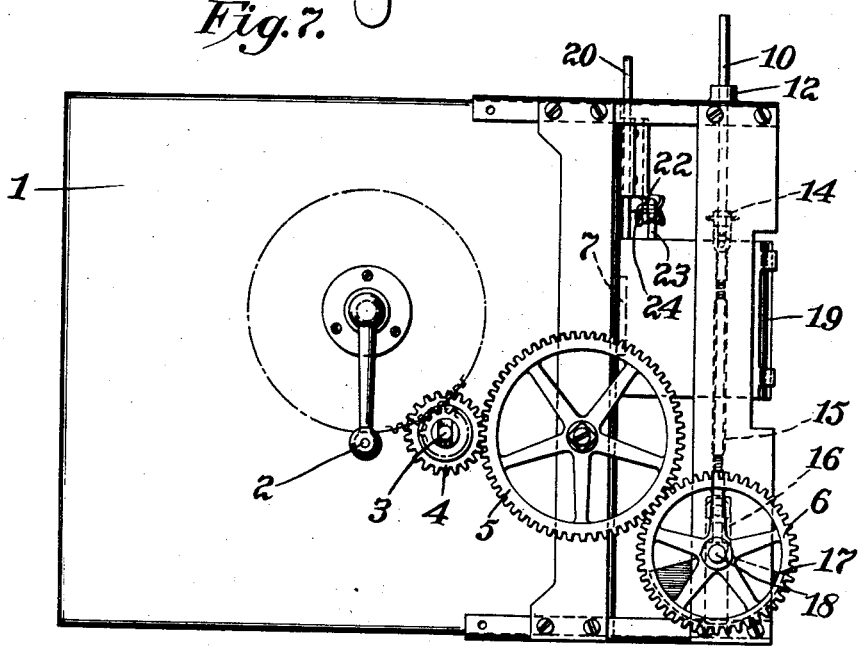
Inventors:
George Lane,
John E. Patterson,
by Spear, Middleton, Donaldson & Hall
Attys.

Patented May 5, 1925.

1,536,719

UNITED STATES PATENT OFFICE.

GEORGE LANE AND JOHN E. PATTERSON, OF POUGHKEEPSIE, NEW YORK.

METHOD OF AND APPARATUS FOR STEREOSCOPIC PHOTOGRAPHY.

Application filed August 11, 1923. Serial No. 656,836.

*To all whom it may concern:*

Be it known that we, GEORGE LANE and JOHN E. PATTERSON, citizens of the United States, and residents of Poughkeepsie, in the county of Dutchess and State of New York, have invented certain new and useful Improvements in Methods of and Apparatus for Stereoscopic Photography, of which the following is a specification.

Our present invention concerns an adjustment of a camera used for the taking of stereoscopic pairs of pictures, and has particularly in mind the elimination of undue eye strain which the viewer experiences when looking at stereoscopic pairs of pictures especially when taken from points separated greater than the distances of separation between the human eyes.

When directly viewing objects, the human eyes focus upon a point in the object, and in so doing the relative angles of the two lines of vision vary with the distance separating the eye and the object. When the eyes are focusing upon a point far away, the angle of convergence is practically nil, whereas when viewing an object within a few inches or a foot from the eyes, the angles of convergence are much larger and appreciable.

In photographing objects in a stereoscopic camera adapted to produce a film for use in moving picture machines, we have found that with the ordinary separation of points from which the stereoscopic pairs are taken, objects relatively far from the camera do not show up in stereoscopic relief as well as those objects close at hand. This is due to the fact that the axes of convergence for the distant objects is less than the axes of convergence in the closer objects. We have found that if the distance of separation of the points from which stereoscopic pairs of pictures is taken is increased, the stereoscopic relief of distant objects is materially improved, and those of closer objects likewise. If, however, in projecting the picture on a screen, the observer focuses his eyes upon a distant principal object, such as a horse, and this horse is rapidly moving toward the foreground, it will be apparent that the axes of convergence of the observer's eyes are increased as the principal object in the picture appears to advance. There comes a point in the advance of the principal object at which the eyes of the observer, being less separated than the points of separation from which the stereoscopic pairs of pictures were taken, attempt to accommodate themselves to these unnatural conditions with the result that a considerable eye strain is experienced. This condition exists with reference to any object in the picture which appears at a point closer than ten or twelve feet from the observer, but no eye strain is experienced unless the observer attempts to focus his eyes directly upon these objects. This he ordinarily does not do, inasmuch as the eyes are focused upon the principal object in the picture, and see all others indirectly.

This invention, then, contemplates a method and means for eliminating the eye strain due to unnatural convergence of axes produced in the eyes of the observer when stereoscopic pairs of pictures are viewed, and even to reduce the muscular action below that required in normal vision of nature.

Stereoscopic pairs of pictures, if projected upon the same area of a sensitive surface, would produce two pictures out of register. If the distance of separation of the points from which the pictures are taken is approximately that of the human eye, and means are used for transmitting the right and left hand pictures to the respective eyes of the observer, the eyes of the observer can take care of this picture without strain. On the other hand, where the distance of separation of the points from which the stereoscopic pairs of pictures are taken is increased, as has been shown to be desirable, this out of register circumstance increases proportionately, especially for objects close to the camera. By side-shifting one of the projected pictures, of course any desired object can be brought into register, and we have found that by properly adjusting the relative lateral position of the principal object of interest in the right and left pictures, eye strain is practically eliminated.

We accomplish this by so photographing the pairs of pictures that such object occupies the desired lateral relative location in the right and left hand negatives, the whole field of one picture being laterally shifted as required. The amount of required adjustment depending upon the distance of the object, as does also the focal setting of the lens, it is convenient to automatically care for this by mechanically connecting instrumentalities as hereinafter described.

In the accompanying drawings we have illustrated means whereby the results desired may be accomplished, but obviously various other means will occur to those skilled in the art, which must of necessity differ from those shown, because of the various designs of taking cameras, and to which it is advisable that this invention be applied.

In these drawings:—

Figures 1 and 2 are front views of a device embodying our invention, showing mirrors in two positions.

Fig. 3 is a side elevation.

Figs. 4 and 5 show details of the adjustment mechanism.

Fig. 6 is a plan view.

Fig. 7 is a side elevation.

Referring now with particularity to the form illustrated, we have shown a camera box at 1 having the usual crank 2 for reeling and exposing film. A trick shaft 3 to which is attached a gear 4, meshes with a gear 5, which in turn is connected to the driven gear wheel 6. The photographic lens of the camera is illustrated at 7. Vertical mirrors 8 and 9, preferably the first surface type, are placed one above the other and mounted upon rods 10 and 11 respectively. These rods are vertically reciprocable in bearings 12 and 13. A cross bar 14 connecting the rods 10 and 11 is secured to a pitman 15 which is in turn attached to a crank arm 16 with a counter-weight 17. The arm 16 and associated mechanism, is mounted for rotation upon a shaft 18 which carries the gear wheel 6. Thus one-half rotation of the wheel 6 will cause an extreme vertical movement of the mirrors 8 and 9. The mirror 9 is adapted to occupy a position directly in front of, but at substantially 45° to the axis of lens 7, when the crank arm 16 occupies its uppermost vertical position. Likewise the mirror 8 occupies a position in front of, but 45° to the axis of the lens when the crank arm 16 occupies its extreme downward position. Additional mirrors 19 and 19', substantially parallel to the surface of mirrors 8 and 9, are provided to doubly reflect the image of the subject into the lens 7.

The lens 7 is of the usual type, located within a screw threaded barrel mechanism, or held frictionally within a casing, and adapted to be moved in and out to focus the object upon the sensitive surface. These instrumentalities are not illustrated because they are well known, and no invention resides in the use of these parts. An arm 20 connected to and surrounding the lens 7, may be moved laterally of the camera through a slot 21, to effect the focus of the lens. Movement of the lever 20 in either direction in the slot will obviously cause a partial rotation of the lens barrel and therefore, cause the same to approach or recede from the sensitive surface.

Secured to the lever 20 is an arm 22 from which depends a wedge-shaped bar 23. The bar 23 is pivotally secured to the end of the arm 22, as by means of pin 24.

The mirror 19' is held within a frame 25 having retaining lug 26 thereon passing around and engaging the front of the mirror to hold the same in its proper position. To the frame 25 is secured a member 27 having outwardly extending arms 28 to which are attached in a pivotal manner, the arms 29 of a similar part 30. This element 30 is bolted to an upright 31 secured to the frame of the camera. It will thus be seen that the mirror 19' may be rotated about the pivot points of the arms 28 and 29.

Also secured to the frame 25 is a U-shaped member 32 having an upwardly extending arm 33. An L-iron 34 is secured to the upright 31 and having one portion substantially parallel with the up-standing part 33. These last two parts are perforated to receive a bolt shank 35 having a head 36 and adapted to receive a nut 37 on the opposite side of the part 33. A spiral spring 38 causes tension to be applied between the parts 33 and 34. The wedge-shaped arm 23 passes between the head 36 of the bolt and the part 34.

An arm 39, encircling the lens 7 and operating the usual diaphram (not shown) may be provided to project outwardly a sufficient distance to allow the same to be grasped by the operator.

The operation of the device is as follows: Rotation of the crank 2 causes the ordinary feeding of the film past the lens 7, and also rotation of the gear wheel 6. Movement of this latter member causes a reciprocal motion of the rods 10 and 11 to which mirrors 8 and 9 are connected, thereby alternately presenting these members to the lens of the camera. Thus for a right-hand picture, light striking mirror 19 is reflected to the mirror 9 and thence into the lens. Further movement of the gear 6 causes the mirror 8 to move from in front of the lens, thus presenting mirror 9 thereto, and a left-hand picture is then formed as the light strikes mirror 19' and is reflected into the mirror 8 and thence into the lens 7. It will be apparent that movement of the mirrors 8 and 9, being in the plane of their surfaces, the exact location is immaterial during the exposure, provided they respectively and alternately cover the field. Movement in their plane during exposure, has no undesirable effect. If the mirrors 8 and 9 so move during the respective exposures, any imperfection in the mirrors is equally distributed over the picture presented to the film, thereby eliminating local defects.

As has been described above, it is desirable to laterally shift one of the pictures on the film as the principal object advances or recedes from the camera, so as to keep said object in practically the same lateral position in both the right and left hand negatives. The shifting of mirror 19 does not alter perceptibly the distance of separation from which the stereoscopic pictures are taken, but moves the view on the negative. Consequently when a positive is projected, a similar movement is carried to the screen. If the principal object is located in the same spot on the screen as seen by each eye of an observer, regardless of whether it is near the camera or far away, it is evident that the angle of convergence of one's eyes need not change in following it. Therefore, muscular effort is reduced. We get the stereoscopic effect just the same because that illusion does not seem to be due to convergence of the eyes at all, but rather to the composite effect of the two different views. This may, obviously, be accomplished by pivoting either of the mirrors 19 or 19'. It will be apparent that movement of either of these mirrors about a vertical axis would have the effect of changing the relative position of the image taken through the lens upon the sensitive surface of the film. This movement need be very minute in order to produce this result.

It becomes necessary in cameras of this type to adjust the lens for a new focal length where the principal object of a picture advances closer to, or recedes from the camera. We have, therefore, combined the means for adjusting the focus of the lens and the means for causing pivotal movement of one of the mirrors if both operations are desired to be performed at the same time.

It will be obvious from the drawings that when it becomes necessary to focus the lens by movement of the lever 20 from a position other than that occupied by the lever when at its extreme left position, movement toward the right of this lever will cause the arm 22 to be raised. This action causes the wedge-shaped arm 23 to also be raised, thus producing horizontal movement of the bolt 35 against the action of spring 38. As the other end of the bolt moves horizontally it carries with it the up-standing arm 33 which is connected to the frame 25 carrying the mirror 19' and thereby causing rotation of the mirror about its vertical pivot. The degree of movement of the mirror will be determined by practice and can be controlled by varying the leverage on the wedge-shaped member 23. By this means the out of register circumstance may be entirely or partially corrected, as desired.

What we claim is:—

1. An apparatus of the type described including a casing adapted to contain a light sensitive surface, a lens, means to expose the sensitive surface to images of an object viewed from a convergent angle, and means to adjust the position of the images on the sensitive surface, said position adjusting means including a pivoted mirror and means to cause rotation of said mirror about a vertical pivot, said last named means including an arm connected with a focus adjuster attached to the lens.

2. An apparatus of the type described including a casing adapted to contain a light sensitive surface, a lens, means to expose the sensitive surface to images of an object viewed from a convergent angle, and means to adjust the position of the images on the sensitive surface, said position adjusting means including a pivoted mirror and means to cause rotation of said mirror about a vertical pivot, said last named means including a wedge-shaped arm engaging a member attached to said mirror whereby movement of the wedge-shaped arm in a vertical direction causes horizontal movement of the member attached to the mirror and a rotative movement of the mirror.

3. A method of lateral registration in the photographing of stereoscopic pictures which includes the steps of exposing the sensitive surfaces to the images of an object as viewed from spaced apart points, and shifting the focal setting of the lens and shifting the light beams from one view of the object on the sensitive surface automatically in harmony with the focal setting of the taking lens.

4. An apparatus of the type described, including a casing adapted to contain a single width light sensitive film strip, a lens, means to focus said lens, means to expose the sensitive surface to images of an object viewed from a convergent angle, means to adjust the position of the images on the sensitive surface, and a mechanical connection between said positioning means and said focusing means.

In testimony whereof, we affix our signatures.

GEORGE LANE.
JOHN E. PATTERSON.